June 29, 1937.    J. MONIER    2,085,507

AUTOMATIC LOOM FOR THE MANUFACTURE OF KNOT STITCH CARPETS

Filed Jan. 30, 1934    13 Sheets-Sheet 1

June 29, 1937.  J. MONIER  2,085,507
AUTOMATIC LOOM FOR THE MANUFACTURE OF KNOT STITCH CARPETS
Filed Jan. 30, 1934   13 Sheets-Sheet 5

J. Monier
INVENTOR

By: Marks & Clerk
Attys.

June 29, 1937.  J. MONIER  2,085,507
AUTOMATIC LOOM FOR THE MANUFACTURE OF KNOT STITCH CARPETS
Filed Jan. 30, 1934   13 Sheets-Sheet 6

J. Monier
INVENTOR
By: Marks & Clerk
Attys.

June 29, 1937.  J. MONIER  2,085,507
AUTOMATIC LOOM FOR THE MANUFACTURE OF KNOT STITCH CARPETS
Filed Jan. 30, 1934   13 Sheets-Sheet 8

J. Monier
INVENTOR

By Marks & Clerk
Attys.

June 29, 1937.  J. MONIER  2,085,507
AUTOMATIC LOOM FOR THE MANUFACTURE OF KNOT STITCH CARPETS
Filed Jan. 30, 1934   13 Sheets-Sheet 9

June 29, 1937.  J. MONIER  2,085,507
AUTOMATIC LOOM FOR THE MANUFACTURE OF KNOT STITCH CARPETS
Filed Jan. 30, 1934  13 Sheets-Sheet 10

J. Monier
INVENTOR

By Marks & Clerk
Attys.

Patented June 29, 1937

2,085,507

UNITED STATES PATENT OFFICE 2,085,507

AUTOMATIC LOOM FOR THE MANUFACTURE OF KNOT STITCH CARPETS

Jules Monier, Paris, France, assignor to Societe Anonyme de Fabrication de Tapis a Points Noues Saftan, Paris, France Application January 30, 1934, Serial No. 709,041
In France February 16, 1933

14 Claims. (Cl. 139—4)

The present invention relates to the manufacture of knot stitch carpets by means of looms of the type disclosed in U. S. Patent No. 1,690,802 dated November 6, 1928, modified to include the device for transforming Persian into Smyrna stitches in accordance with the disclosure in Patent No. 1,803,222 dated April 28, 1931.

The object of the present invention is to render the operation of the loom entirely automatic for rendering the manufacture of carpets more economical by the continuous operation of the loom at a higher speed than heretofore possible.

In the accompanying drawings wherein an approved embodiment of the invention is illustrated:—

Referring to the drawings in detail the loom consists of a suitable frame structure in which a sheet of warp threads $a^1$ unwinds from a warp beam $a^2$, passing over a thread tensioning device $a^3$. During the winding of the pile threads around the warp threads, the said pile threads are held by the gripping of the warp threads between them. A suitable shed forming device such as indicated at 8 and a shuttle picking motion system are employed but are not described in detail since they are well known in the art of looms to which this invention relates.

Figure 1:
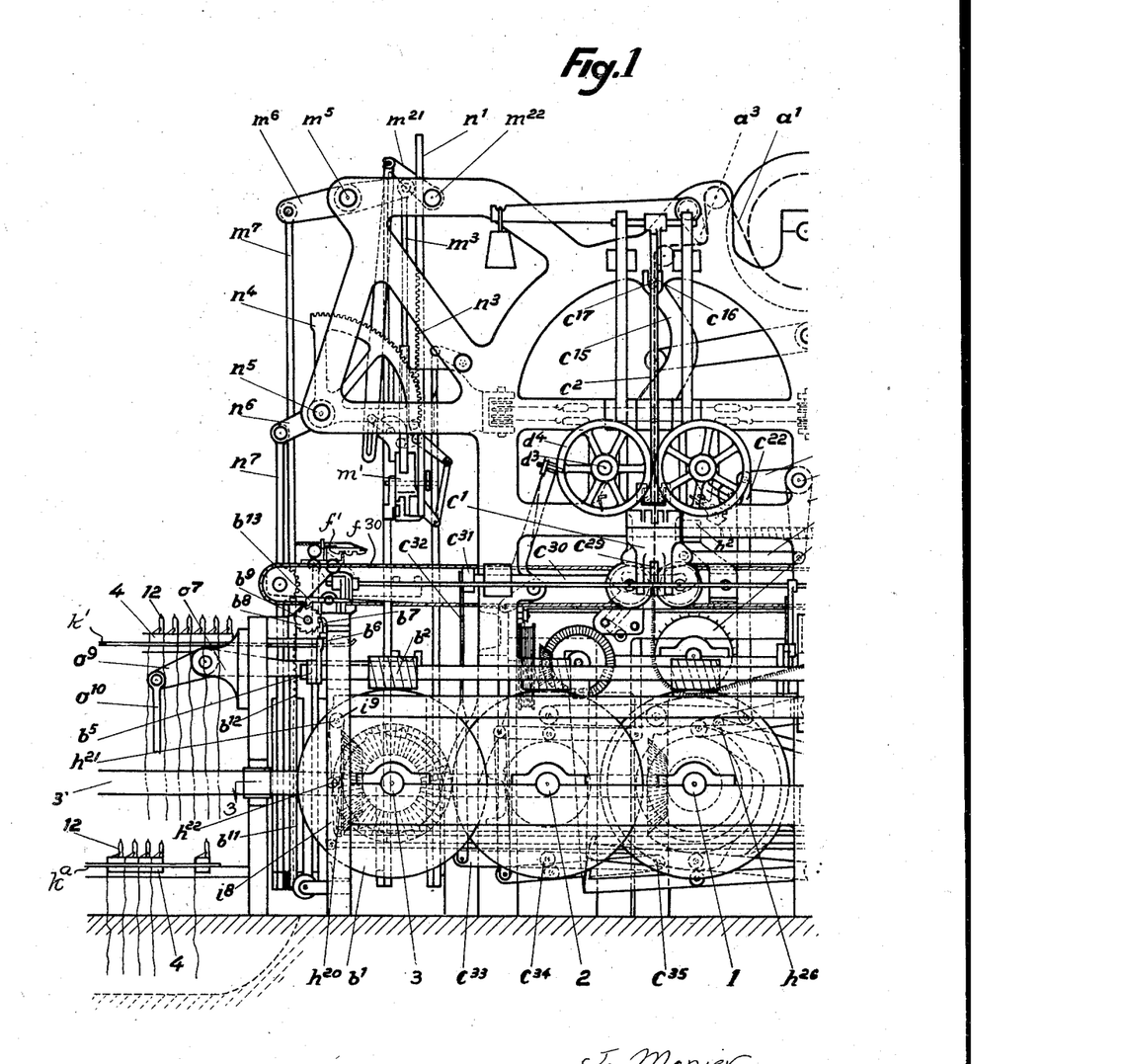
Figs. 1 and 1a taken together present a side elevation of the loom.
Figure 1A:
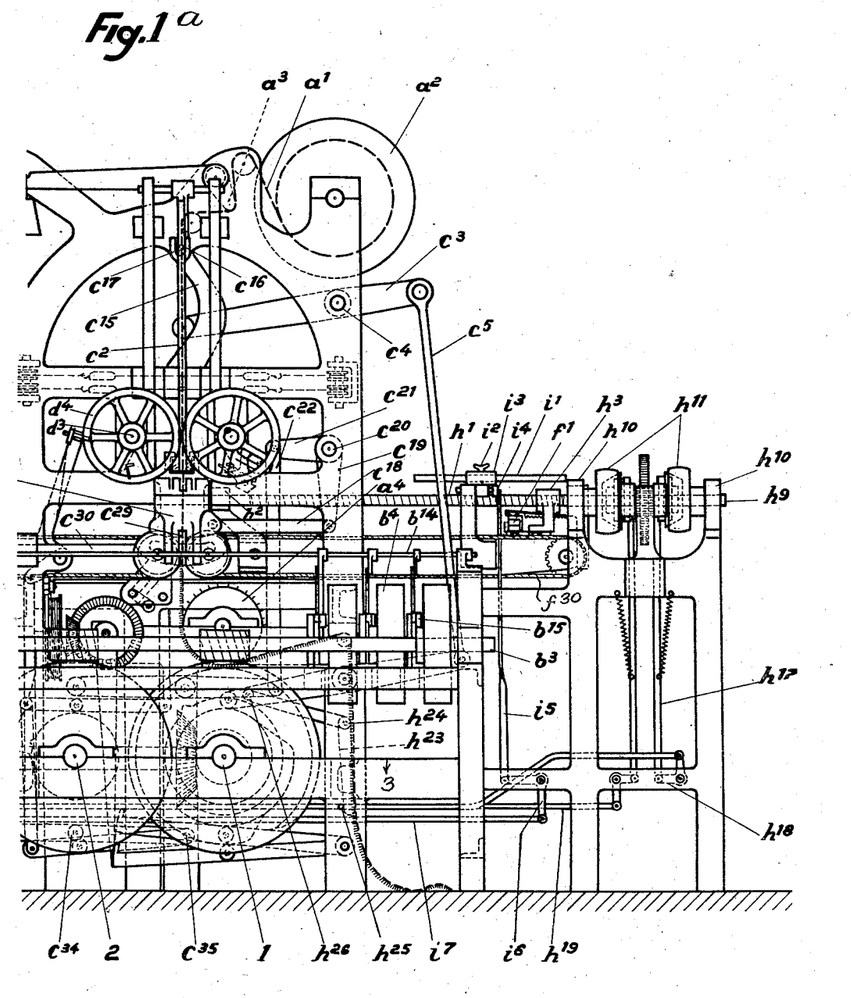
Figure 3:
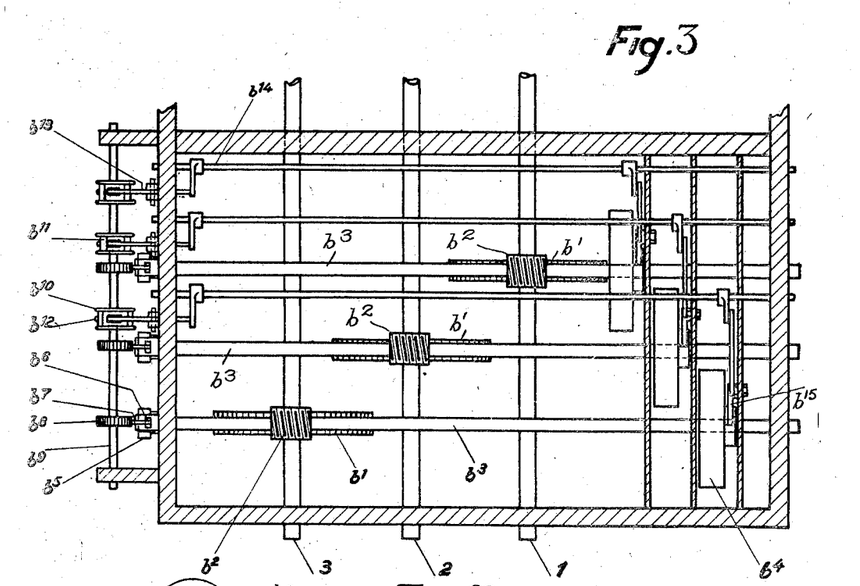
Fig. 3 is a detail horizontal sectional view taken approximately in the plane of the line 3—3 of Fig. 1.

The mechanism for effecting the automatic operation of the loom includes three shafts 1, 2, and 3 which appear in Fig. 1 and are shown in top plan view in Fig. 3. These three shafts operate various mechanisms of the loom in timed relation as will hereinafter appear.

As shown in Fig. 3, each shaft 1, 2, and 3 carries a worm wheel $b^1$ engaging a worm $b^2$ mounted upon a shaft $b^3$ carrying at one end a Bliss clutch $b^4$ which is driven by a power transmitting belt or the like. At the other end each shaft $b^3$ carries a cam $b^5$ on which engages a push piece $b^6$ provided with a pawl $b^7$ in constant engagement with a ratchet wheel $b^8$ mounted upon a common shaft $b^9$. Three double toothed wheels $b^{10}$ provided with the same number of teeth as the ratchet wheels $b^8$ are mounted upon the shaft $b^9$ and each wheel $b^{10}$ carries a pattern chain $b^{11}$ the links of which are provided with projections $b^{12}$. A pivoted lever $b^{13}$ is engageable at one end with the projections of each chain $b^{11}$ and is connected at its opposite end by a linkage $b^{14}$ with the actuating dog $b^{15}$ of the related clutch $b^4$.

Figure 2:
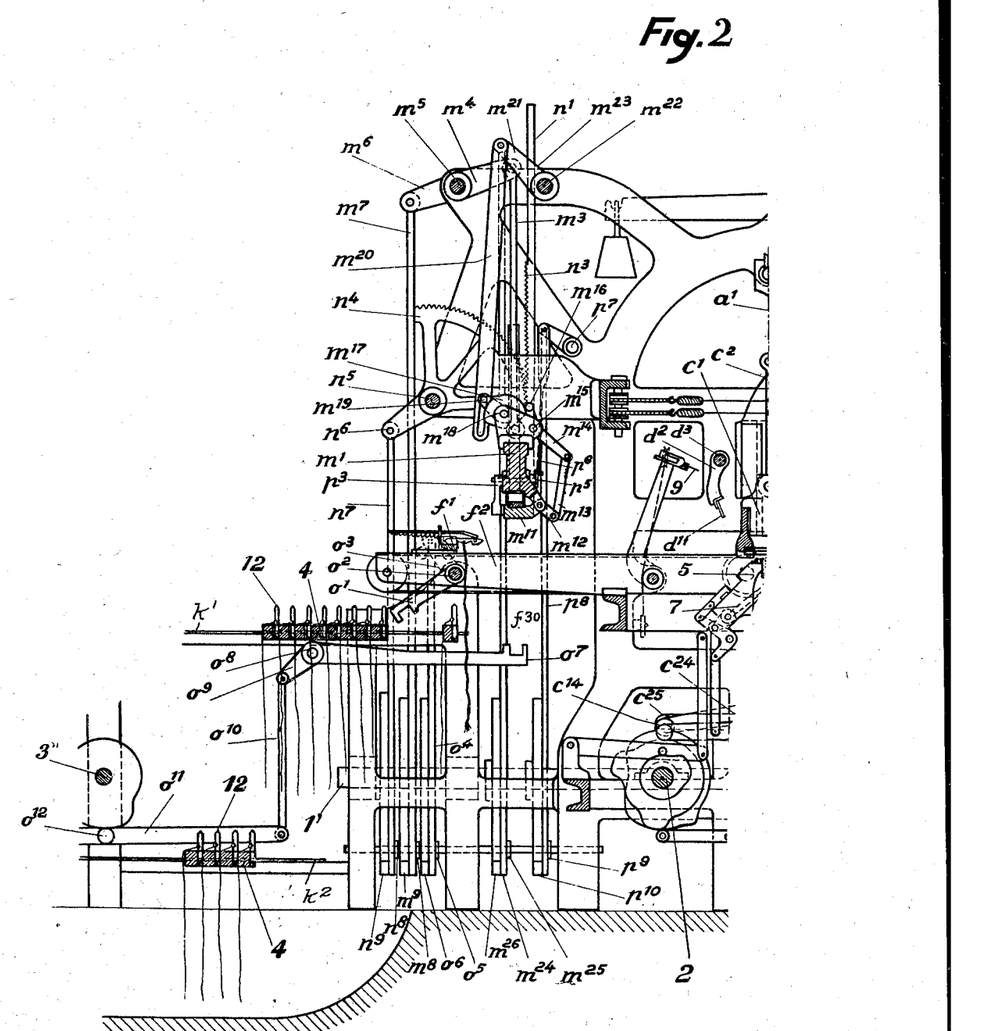
Figs. 2 and 2a taken together present a longitudinal sectional view through the loom.
Figure 2A:
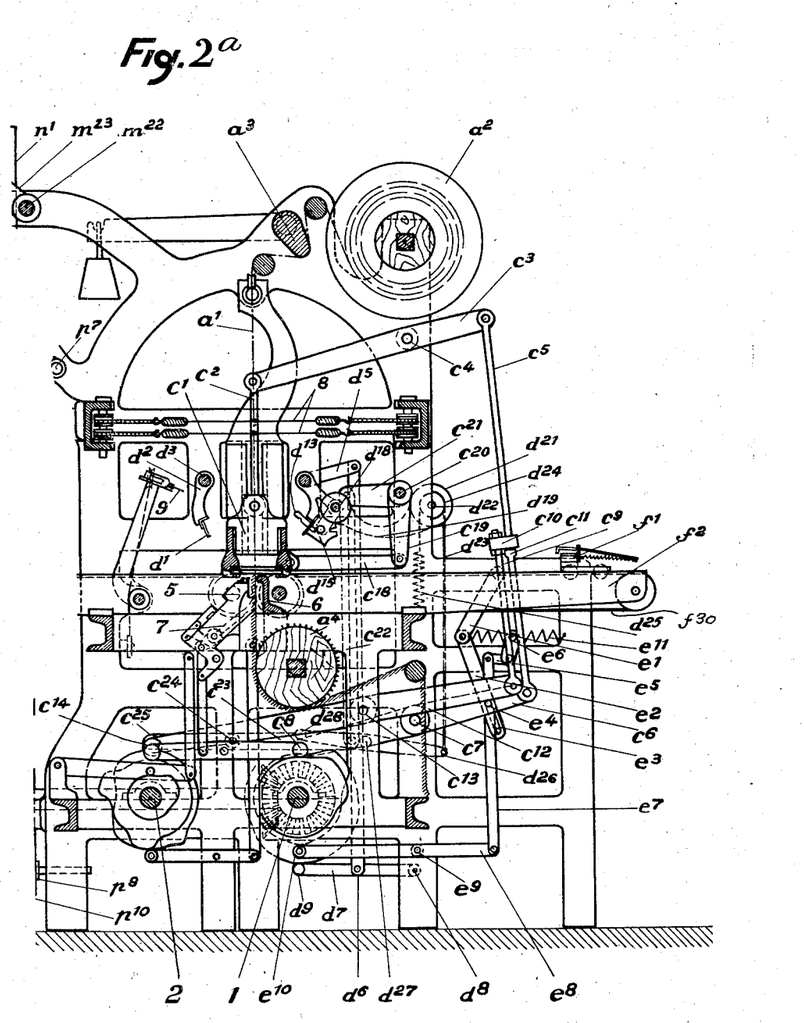
Figures 7, 8, 9:
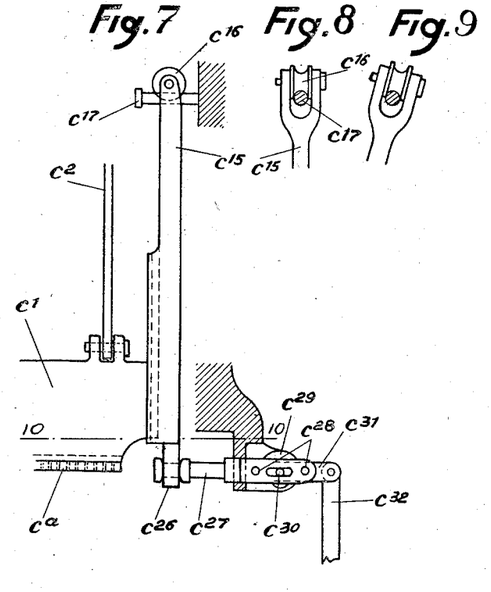
Fig. 7 is a fragmentary detail view of the vertically movable batten and the supporting and operating means therefor.
Figs. 8 and 9 are detail views showing the different positions of the guide for the batten.
Figure 14:
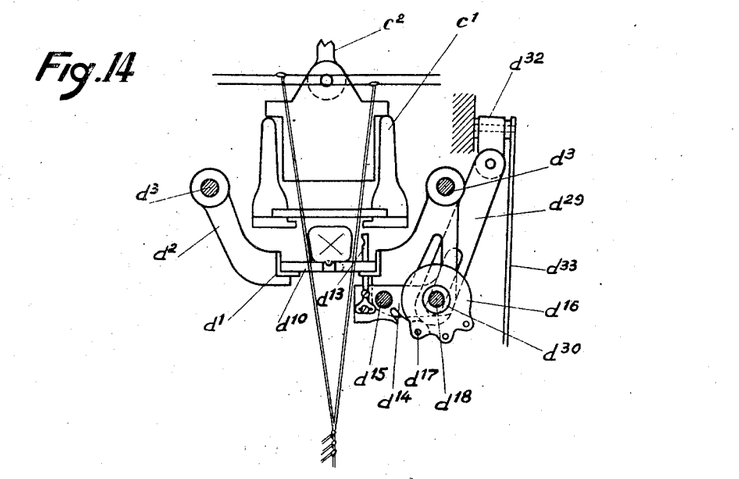
Fig. 14 is a detail vertical section through the loom showing the batten, shuttle race forming device and the weft thread extending device.

The batten $c^1$, Figs. 2, 7, and 14, is of the type disclosed in prior U. S. Patents Nos. 1,690,802 and 1,864,106 dated November 6, 1928 and June 21, 1932, respectively, that is to say, the batten is combined with a warp selecting device including a selecting comb $c^a$. The batten is supported by two links $c^2$ operated by levers $c^3$ pivotally mounted at $c^4$ on the loom frame and connected by rods $c^5$ with levers $c^6$ pivoted at $c^7$ and provided with rollers $c^8$ engaged and operated by cams keyed on the shaft 1. Other rods $c^9$ are provided with heads $c^{10}$ slidable on the rod $c^5$ which latter are provided with lugs $C^{11}$ constituting a stop for limiting the upward movement of the rods $c^5$. The rods $c^9$ are connected with levers $c^{12}$ pivoted at $c^{13}$ having terminal rollers $c^{14}$ engaging cams keyed on the shaft 2.

Figure 10:
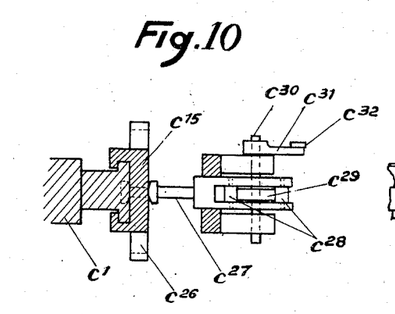
Fig. 10 is a horizontal sectional view on the line 10—10 of Fig. 7.

As shown in Fig. 10 each end of the batten $c^1$ is T-shaped and confined for vertical sliding movement in a guide $c^{15}$. These guides, Figs. 7 to 9, are provided at their upper ends with grooved rollers $c^{16}$ mounted upon pins $c^{17}$ fixed to the loom frame. The guides $c^{15}$ together with the batten $c^1$ are swung about the pins $c^{17}$ perpendicularly to the plane of the sheet of warp threads by links $c^{18}$, Fig. 1, levers $c^{19}$ fixed to a shaft $c^{20}$ and actuated by an arm $c^{21}$ connected by a rod $c^{22}$ with a lever $c^{23}$ pivoted at $c^{24}$, the lever $c^{21}$ being provided with a roller $c^{25}$ engaging an operating cam on the shaft 2.

One of the guides $c^{15}$, Figs. 7 and 10, is provided at its lower end with a slot $c^{26}$ receiving a push member $c^{27}$, the slot $c^{26}$ being elongated to permit swinging movement of the guides about the pins $c^{17}$. The push member $c^{27}$ is provided with flanges engaging the guide member at one end and at its opposite end is provided with rollers $c^{28}$ between which is arranged a cam $c^{29}$ mounted upon a shaft $c^{30}$. An arm $c^{31}$ carried by the shaft $c^{30}$ is connected by a rod $c^{32}$, Fig. 1, with a lever $c^{33}$ pivoted at $c^{34}$ and provided with a roller $c^{35}$ engaging a cam on the shaft 2 of the loom.

The device for the periodic formation of a shuttle race for the passage of the shuttle through the shed is shown in Fig. 2 and more in detail in Figs. 14 through 17. The device includes angle members $d^1$ carried by arms $d^2$ secured to shafts $d^3$ on each side of the sheet of warp threads. Two identical gear wheels $d^4$ are secured to the shafts $d^3$ and being in permanent mesh with each other, effect rotation of said shafts in opposite directions. One of the shafts $d^3$ is provided with an operating arm $d^5$ connected by a rod $d^6$ with a lever $d^7$ which latter is pivoted at $d^8$ and provided at its opposite end with a roller $d^9$ engaging a cam on the shaft 1.

The angle members $d^1$ carry relatively short fingers $d^{10}$ which, when the arms $d^2$ are moved together, support the shuttle. As shown in Fig. 14, the fingers $d^{10}$ are spaced apart when in race-forming position and relatively long fingers $d^{11}$ are also mounted on one of the angle members and are provided with recesses $d^{12}$, Fig. 15, disposed in the axis of the shed and in which the weft is laid by the shuttle. Oscillatory Maltese crosses $d^{14}$ are mounted on a shaft $d^{15}$ supported in the arms $d^2$ of the other angle member, the Maltese cross carrying two additional fingers $d^{13}$ which are adapted to rock about the shaft $d^{15}$ between the two positions shown in Figs. 14 and 15. A disk $d^{16}$ carrying a pin $d^{17}$ cooperates with each Maltese cross, Fig. 17.

A second set of disks similar to but differently keyed is arranged by the side of the first set and all the disks are mounted on a shaft $d^{18}$ which is mounted to slide in a direction parallel to the sheet of warp threads and to rotate. Rotary movement is imparted to the shaft $d^{18}$ by a chain $d^{19}$ engaging a pinion $d^{20}$ carried by the shaft $d^{18}$ and a pinion $d^{21}$ (Fig. 2) keyed on an intermediate shaft $d^{22}$ which latter is driven by a chain $d^{23}$ fitted over a pinion $d^{24}$. The chain $d^{23}$ is connected at one end with a spring $d^{25}$ attached to the loom frame and is connected at its opposite end to a lever $d^{26}$ pivoted at $d^{27}$ and engaging at $d^{28}$ with a cam on the shaft 1.

The axial movement of the shaft $d^{18}$ is effected by a lever $d^{29}$ having a slot therein receiving the shaft $d^{18}$ to accommodate the swinging movement of the latter about the axis $d^3$ of the arm $d^2$. The lever $d^{29}$ is confined between two flanges $d^{30}$ on said shaft and is secured by a pin $d^{31}$ to a bell crank lever $d^{32}$ receiving its movement from the rod $d^{33}$ and a cam keyed on the shaft 1.

The batten $c^1$ is moved to raised position by the above mentioned levers $c^6$ and $c^{12}$ operated by the shafts 1 and 2, respectively, but said batten is held in raised position and released to freely fall to beating position by a pair of toggle links $e^1$ and $e^2$, Fig. 2. The adjacent ends of the toggle links are pivotally connected together and the opposite end of one link is pivotally mounted to the loom frame while the opposite end of the other link is slotted and receives a pin $e^4$ fixed to the lever $c^6$. As the lever $c^6$ turns in a clockwise direction, Fig. 2, to raise the batten, the pin $e^4$ is displaced and the toggle links $e^1$ and $e^2$ actuated by the spring $e^{11}$ move into alinement with each other and into engagement with a pin $e^6$ of a pivoted bell crank lever $e^5$. The bell crank lever $e^5$ is connected by a rod $e^7$ with a lever $e^8$ pivoted at $e^9$ and having its opposite end engaged in a cam groove in the shaft 1.

The operation of the lever $e^8$ by the cam groove of the shaft 1 is so timed with relation to the operation of the levers $c^6$ and $c^{12}$ that the bell crank lever $e^5$ is actuated subsequent to the passage of the prominent points of the cams operating said levers $c^6$ and $c^{12}$. Thus the pin $e^6$ engages and breaks the joint of the toggle links $e^1$ and $e^2$ and the batten $c^1$ is permitted to freely fall by its own weight, the pin $e^4$ coacting with the toggle lever $e^2$ to move the latter to the position shown in Fig. 2.

Two carriages $f^1$ carrying the needle receiving boxes 4 are mounted for sliding movement in guides $f^2$ fixed to the frame of the loom, the carriages being operated by two pairs of chains interconnected with each other in accordance with the arrangement disclosed in my above noted Patent 1,690,802. The guides $f^2$ are shown in Fig. 2 and the operating chains $f^{30}$ for the carriages are shown in Fig. 1.

Figures 4, 24:
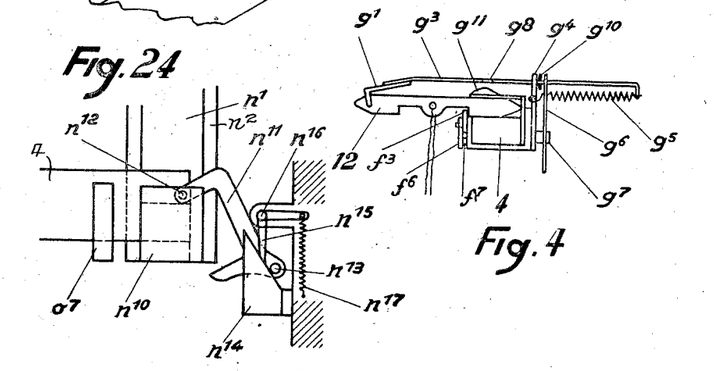
Fig. 4 is a detail side elevation of the right hand needle carriage removed.
Figs. 23 and 24 are horizontal sectional detail and front views, respectively, of the device for releasing the boxes containing the used needles from the needle changing device.
Figure 5:
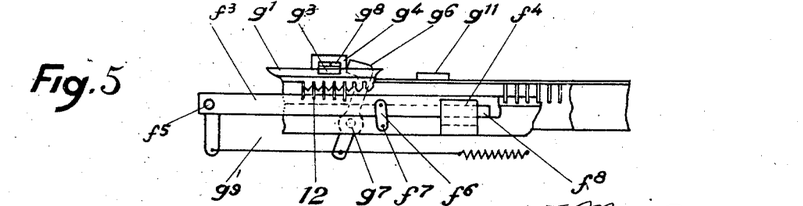
Fig. 5 is a fragmentary front elevation of the carriage showing the needle locking bar in operative position.
Figure 6:
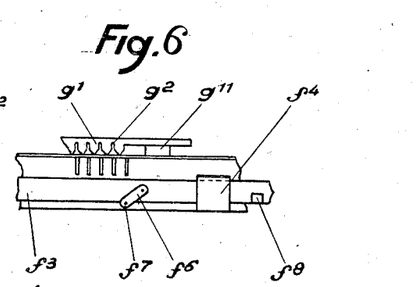
Fig. 6 is a view similar to Fig. 5 showing the locking bar in inoperative position.

Each carriage is provided with means for locking the needles in position therein as shown in detail in Figs. 4 to 6. The locking means consists of a locking bar $f^3$ supported for movement longitudinally of the carriage by means of links $f^6$ pivoted at $f^7$. The locking bar is movable on the guides $f^4$ and a stop $f^8$ is provided thereon for limiting its movement. One end of each locking bar is provided with a finger $f^5$. In its locking position, the bar $f^3$ engages with its stop $f^8$ against the guide $f^4$ as shown in Figs. 4 and 5. In this position the bar is elevated by the links $f^6$ so as to engage the needles 12 to lock the latter in position.

Angular needle guiding and positioning members $g^1$ having inverted V-shaped grooves in the lower edge thereof are supported by arms $g^3$ which are slidable in guides $g^4$ provided in each carriage, the arms $g^3$ and positioning members $g^1$ being normally urged inwardly towards the sheet of warp threads by springs $g^5$. Pawls $g^6$ are pivoted at $g^7$ on the carriage and are adapted to enter in notches $g^8$ formed in the supporting arms $g^3$ when the positioning member $g^1$ is pushed back.

The pawls $g^6$ are all connected by a cable $g^9$ which is attached, on the one hand, to the finger $f^5$ of the locking member $f^3$ and on the other hand to a return spring attached to the carriage. The inward movement of the supporting arms $g^3$ under the influence of the springs $g^5$ is limited by stops $g^{10}$ engageable with the guides $g^4$.

Cams $g^{11}$ provided on the top of the carriage coact with the positioning member $g^1$ to lift the latter when it is moved rearwardly against the tension of the springs $g^5$ so as not to impede the entry of the needles into the carriage.

When one carriage $f^1$ meets the other carriage during their approach toward the sheet of weft threads $a^1$, the points of the needles 12 enter the slots of the box 4 of the opposite carriage. The two carriages continue to advance towards one another, one of the carriages pushing the member $g^1$ against the tension of the springs $g^5$. On return, the supporting arm $g^3$ presents its notch $g^8$ to the pawl $g^6$ which engages therein. The locking bar $f^3$ descends and the needles are free to be withdrawn from the carriage. The opposite carriage having received the ends of the needles, its locking bar $f^3$ slides along the carriage $f^1$, the cable $g^9$ being attached to said bar as shown in Fig. 5.

Figure 18:
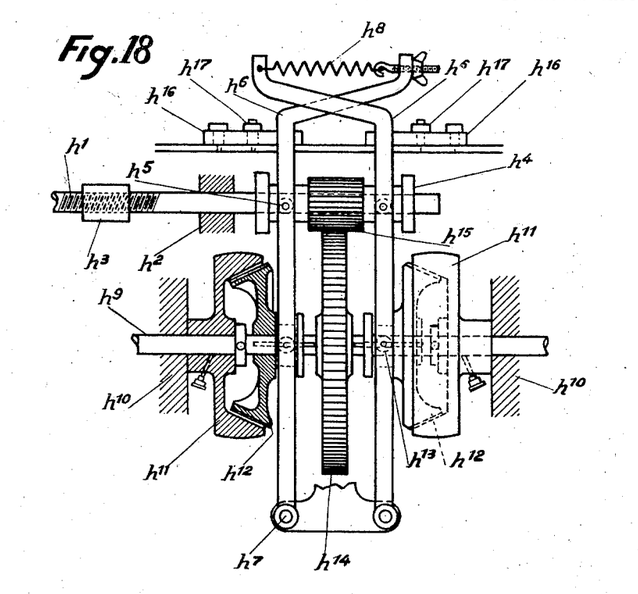
Fig. 18 is a detail sectional view of the carriage drive mechanism.

The means for imparting reciprocating movement to the carriage is shown at the right side of Fig. 1 and illustrated in detail in Fig. 18. This means consists of a worm $h^1$ rotatable in bearings $h^2$ supported on the loom frame and adapted to move longitudinally in said bearings. A nut $h^3$ is fitted on the thread of the worm $h^1$ and the latter is provided with two plates $h^4$ which engage rollers $h^5$ of two forks $h^6$ pivoted at $h^7$ and having the free ends thereof crossed and connected by a spring $h^8$ which normally tends to separate said forks. A countershaft $h^9$ mounted in bearings $h^{10}$ supports two cone clutches of which the outer clutch members $h^{11}$ are loosely mounted on the shaft $h^9$ and are driven by means of belts applied to the exterior of the clutch members, the latter being driven in opposite directions. The inner clutch members $h^{12}$ are slidably keyed on the shaft $h^9$ and are coupled with the forks $h^6$ by rollers $h^{13}$. A large gear wheel $h^{14}$ is rigidly keyed on the shaft $h^9$ between the forks $h^6$ and is in constant mesh with a smaller gear wheel $h^{15}$ keyed to the worm $h^1$ between the plates $h^4$. Two dogs $h^{16}$ hold the forks close together and in turn are controlled by links $h^{17}$, Fig. 1, bell cranks $h^{18}$, rods $h^{19}$ and levers $h^{20}$ pivoted at $h^{21}$ and provided with rollers $h^{22}$ which engage cams on the shaft 3. A bell crank lever $h^{23}$ is pivoted at $h^{24}$ one end of which is adapted to push a finger $h^{25}$ fixed on one of the rods $h^{19}$, the opposite end of the lever $h^{23}$ having a roller $h^{26}$ engaging a cam on the shaft 1.

By the operation of the above mentioned cams on the shafts 1 and 3, the loose clutch members $h^{11}$ are alternately engaged with the inner clutch members, depending on the operation of the dogs $h^{16}$ which are displaced towards the right or the left by the links $h^{17}$. The displacement of the forks $h^6$ to engage either clutch is effected by the spring $h^8$. In this manner, the worm $h^1$ is rotated in one direction or the other, and reciprocating movement is imparted to the carriages.

The return of the carriages $f^1$ is regulated according to the length of the pile thread contained in the needles 12 by an adjustable stop device acting upon the nut $h^3$ and adapted to limit the return of the carriages upon the first passage of the needles. This stop device comprises a rod $i^1$, Fig. 1, adjustable in a member $i^3$ and held in adjusted position by a nut $i^2$. The member $i^3$ is pivoted on the loom frame and is operated by a lever $i^4$, a rod $i^5$ and bell crank $i^6$, a rod $i^7$ and a lever $i^8$ pivoted at $i^9$ and provided with a roller engaging an operating cam on the shaft 3.

As shown in Fig. 2 a cutting table 5, a back comb 6 and a system of hooks 7 are provided to transform the wound stitch into a Smyrna knot in accordance with the disclosure in the above mentioned earlier Patent No. 1,803,222. According to the present invention the previous device is somewhat modified for the purpose of gripping the pile threads above the hooks in the table and not between the last row of stitches and a clamping table above the hooks.

The improvements are shown in detail in Figs. 27 to 31 in which the inclined table is arranged over the entire width of the loom in front of the vertical sheet of warp threads $a^1$ and is capable of being given a to-and-fro longitudinal movement from and towards the warp threads. The table is provided with grooves 15 in which are located the hooks 7. The hooks are reciprocated by the cross member 16 engaging the angular ends of the hooks in accordance with the arrangement in the above noted Patent No. 1,803,222.

In order to prevent the hooks from coming out of the grooves and rocking therein, the upper part of the table is provided at its center with a dove-tail projection 17 over which is engaged a member composed of two parts 18 and 18' extending over the entire length of the table. The side of the table 5 presented to the warp threads is provided between the grooves 15 with beaks 19, Fig. 30, which penetrate the warp threads according to the selection thereof effected by the selector comb, the effect of which is to insure the selection at the base of the warp threads and to prevent the hooks, at the moment they descend, from hooking in the weft of the ground fabric or the warp threads.

Figure 31:
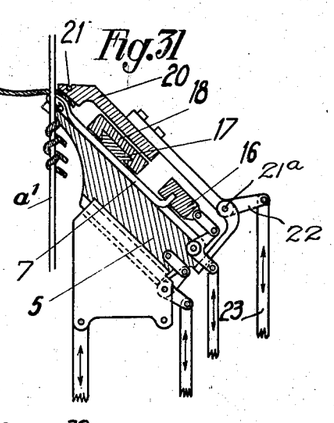
Fig. 31 is a view similar to Fig. 28 showing a different position of the parts, the table resting on the last row of stitches knotted around the warp threads.

To permit the ends of the pile threads carried by the needles 12 to be effectively gripped above the hooks and against the latter as shown in Fig. 31, the cutting member 20 provided with a longitudinal groove 21 for the passage of the knife 9, Fig. 2, is arranged so as to serve also as a clamping or gripping member. For this purpose it is pivoted at 21a and is opened and closed by a lever 22 and operating rod 23.

During the first selection, the table 5 rises, engages its beaks 19 between the selected warp threads $a^1$ and then descends. The pile thread needles 12 draw the pile thread through the warp threads $a^1$ as far as the stop. The cutting member 20 opens, then closes, moves away from and toward the hooks and in closing, grips the free ends of the pile thread against the hooks 7. The succeeding operations of the device for forming the Smyrna knot takes place in accordance with the disclosure in the above noted Patent No. 1,803,222 with the only difference that the pile threads are placed above the hooks 7 instead of being placed below them and that the table 5 is provided with beaks 19 at the end of each groove. The knife 9 is adapted to cut the threads for knotting in accordance with the arrangement disclosed in Patent 1,690,802.

Figure 30:
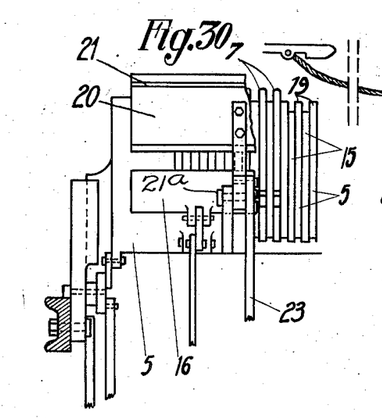
Fig. 30 is a partial front elevation of the cutting and clamping table.

A knife such as designated at 9 in Fig. 2 and cooperating with the groove 21 shown in Figs. 30 and 31 presents certain disadvantages and in particular is objectionable owing to the necessity of momentarily stopping the operation of the loom during the cutting operation thereby slowing up the production.

Figures 32, 33:
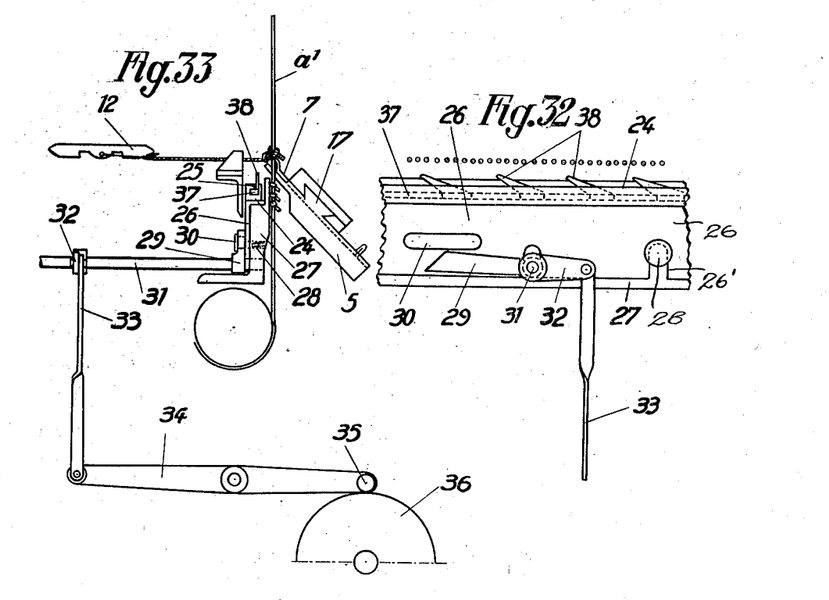
Fig. 32 is a partial elevation of a modified form of cutting device.
Fig. 33 is an end view of the modified cutting device showing part of the operating means therefor.

This is obviated by the modification of the cutting mechanism as illustrated in Figs. 32 to 37. According to this arrangement a guide 24 having a groove 25 therein is supported by an angular member 26 slidable vertically upon screws 28 engaging in slots 26' provided in the member 26. The screws 28 are fitted in the supporting member 27 suitably mounted in the loom and carrying a stub shaft 31 provided with arms 29 and 32, the last mentioned arm being connected by the link 33 with a lever 34 engaging at 35 with an actuating cam 36 (Fig. 33). The other arm 29 engages an abutment 30 on the angular member 26 whereby movement of the lever 34 is imparted to the angular member 26 and produces an upward movement of the latter.

A rod 37 is slidable longitudinally in the groove 25 and is provided with cutting blades 38 projecting above the guide 24. The knife blade supporting rod 37 is actuated by a link 39 connected with an arm 40 of a two-armed lever which is pivoted at 41 and the other arm 42 of which is connected by a link 43 with a lever 44 engaged at 45 with an operating cam 46.

Figures 34, 35:
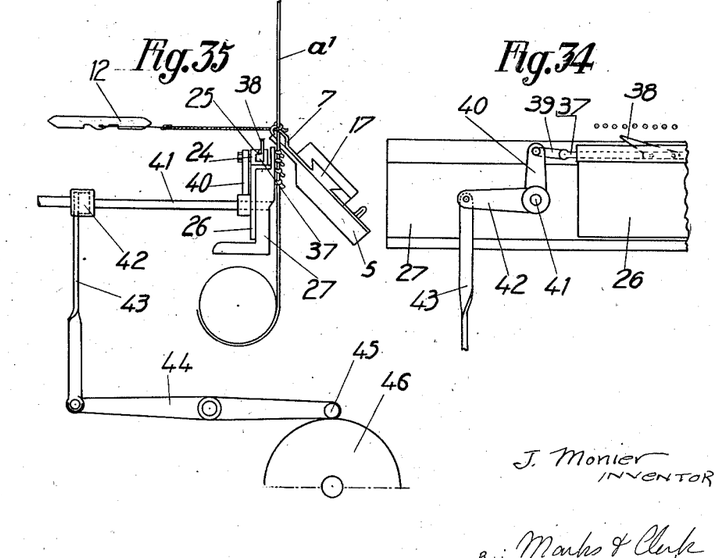
Fig. 34 is a view similar to Fig. 32 showing the means for actuating the cutting blades.
Fig. 35 is a view similar to Fig. 33 showing another part of the operating means for the cutting device.
Figure 36:
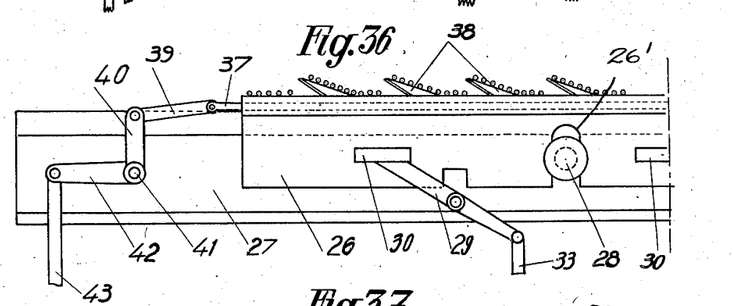
Figs. 36 and 37 are views similar to Fig. 34 showing two other positions of the cutting blades.
Figure 37:
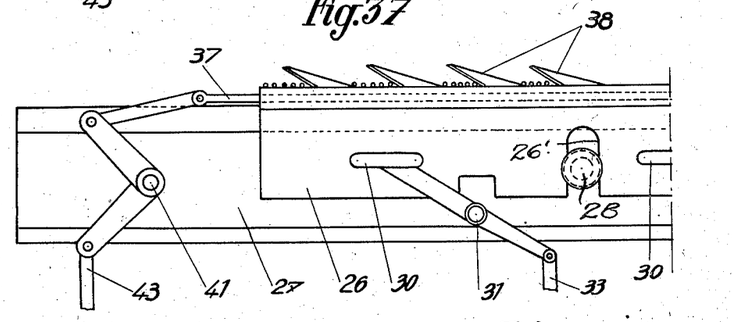

In operation, the pile thread needles 12 being in a position shown in Figs. 33 and 35 and the hooks 7 having in each engaged a pile thread of a needle, as shown in said figures, the cam 36 acting through the lever 34, link 33, arms 32 and 29 on the abutment 30, raises the angular member 26 together with the rod 37 and the cutting blades secured thereto. In this manner, the angular member 26 is raised to the position shown in Fig. 36 wherein it lies immediately below the sheet formed by the pile threads, the points of the blades 38 sliding between the pile threads.

In this position, the movement of the angle member 26 is momentarily arrested and the cam 46 initiates movement of the lever 44 and this motion is transmitted through the link 43 and arms 42 and 40 to the rod 37 and the blades 38 carried thereby. The longitudinal movement of the blades 38 in the groove 25 produces a shearing cutting of the pile threads as they are successively engaged and in this manner the entire sheet of pile threads is cut.

Following the cutting operation, the cam 46 restores the blade supporting rod 37 to initial position and the cam 36 permits the angular member 26 and the blade rod supported therein to descend to normal position. From the foregoing it is evident that the extent of displacement of the cutting blades 38 for severing all of the pile threads is a function of the number of blades employed and thus it is possible, by increasing the number of blades to reduce the displacement necessary for cutting all of the pile threads.

Figure 19:
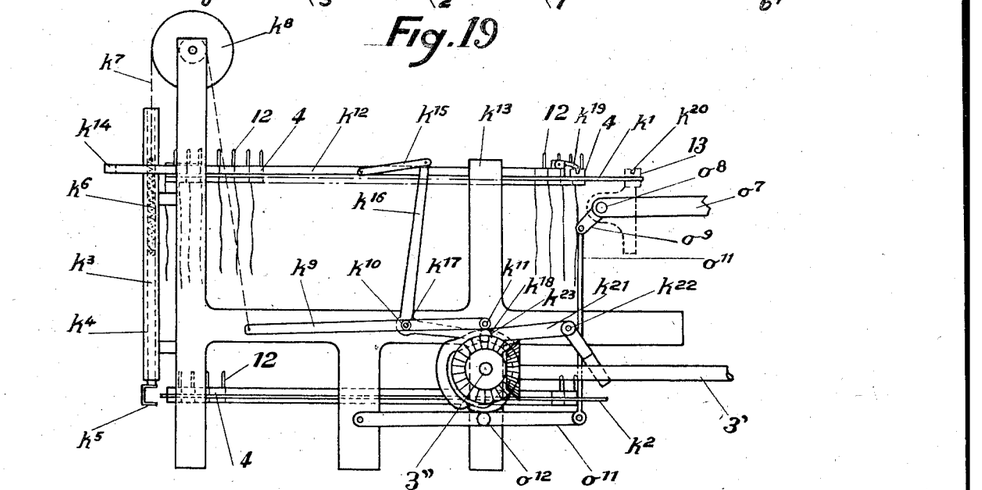
Fig. 19 is a detail side elevation of the racks receiving the boxes containing the used and unused needles and the mechanism associated therewith.
Figure 20:
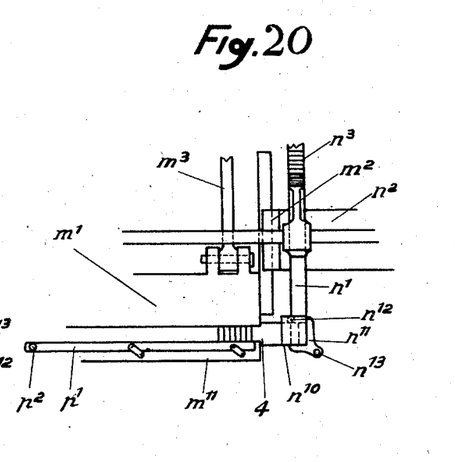
Fig. 20 is a fragmentary front view of a portion of the needle changing device.
Figure 21:
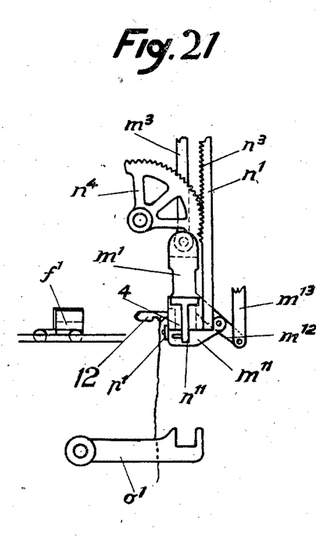
Fig. 21 is a side elevation of the arrangement shown in Fig. 20.

At one end of the loom a rack $k^1$ is arranged and along which boxes containing unused needles containing a fresh supply of pile thread are advanced to the needle changing device to be hereinafter more fully described. A second rack $k^2$ is arranged below the first mentioned rack and is adapted to receive the boxes containing the used needles deposited thereon by said needle changing device. The general arrangement of these racks is shown in Figs. 1 and 2 and the mechanism associated therewith is illustrated in detail in Fig. 19.

Guides $k^3$ are slidably mounted in tracks $k^4$ and carry at their lower end a claw member $k^5$, the movement of the guides $k^3$ being controlled by springs $k^6$ and cables $k^7$ extending over pulleys $k^8$ which latter are connected with a lever $k^9$ pivotally mounted at $k^{10}$, the lever carrying a roller $k^{11}$ engaging a cam on a shaft 3'' connected by suitable gearing and an intermediate shaft 3' to the loom shaft 3. During the operation of the guides $k^3$, a needle box 4 moving along the lower rack $k^2$ is positioned in a claw member $k^5$ and raised to the level of the upper racks $k^1$.

Reciprocating bars $k^{12}$ are slidably mounted in guides $k^{13}$ and the rear end of each bar is provided with a push finger $k^{14}$ adapted to engage and push the end pieces 13 (Fig. 25) of the needle box which has been raised by the claw member $k^5$ and move said needle box onto the upper racks $k^1$. The end pieces 13 are formed with grooves 14 receiving the edges of the racks $k^1$ and $k^2$ thereby guiding the movement of the needle boxes along said racks.

The bars $k^{12}$ are connected by links $k^{15}$ with a crank lever $k^{16}$ pivoted at $k^{17}$ and carrying a roller $k^{18}$ engaging a cam keyed on the shaft 3''. The motion of the lever $k^{16}$ is thus transmitted to the bars $k^{12}$ and the latter are reciprocated in the guides $k^{13}$. At the opposite ends of the bars $k^{12}$ pawls $k^{19}$ are pivotally mounted and are engageable in grooves $k^{20}$ (Fig. 25) of the end pieces 13 of the needle boxes.

The stroke of the bars $k^{12}$ is so regulated that during their movement toward the loom the pawls $k^{19}$ engage in a groove $k^{20}$ of one of the needle boxes and move the latter into position to be engaged by the needle changing device. The position to which the needle box is advanced by actuation of the pawls $k^{19}$ is shown in Fig. 2. During the stroke of the bars $k^{12}$ toward the loom the fingers $k^{14}$ thereof engage a needle box which has been raised by the claw member $k^5$ and advances said needle box together with those in the row ahead of it along the upper racks $k^1$. In this manner the needle boxes on the upper rack are advanced one step along the rack $k^1$ so that the one nearest adjacent the loom is in position to be engaged and actuated by the pawls $k^{19}$ on the succeeding stroke of the bars $k^{12}$.

An arrangement is also provided for moving the needle boxes rearwardly along the lower rack $k^2$ which consists of a bell crank lever $k^{21}$ pivoted at $k^{22}$ and provided at one end with a roller $k^{23}$ engaging a cam keyed on the shaft $3''$. The opposite depending arm of the lever $k^{21}$ engages the end pieces 13 of the needle boxes last deposited on the lower racks $k^2$ by the needle changing device and thus periodically moves the several needle boxes rearwardly along said lower racks whereby they are caused to successively enter the claw member $k^5$.

The position of the needle changing device is shown in relation to the other parts of the loom at the upper left part of Figs. 1 and 2 and is illustrated in detail in Figs. 20 to 24 and 38 to 40. The device consists of a vertically movable member $m^1$ slidable in guides $m^2$ and receiving its movement from rods $m^3$ connected with arms $m^4$ pivotally mounted at $m^5$. The arms $m^4$ are connected with arms $m^6$ which latter are connected by rods $m^7$ with a lever $m^8$, the roller $m^9$ of which engages a cam keyed on the shaft $1'$ which is connected by a train of gears to the shaft $1$ of the loom (Fig. 2).

A jaw $m^{11}$ is pivoted to the lower part of the member $m^1$ and is provided with an arm $m^{12}$ connected by a link $m^{13}$ with a lever $m^{14}$ (Fig. 2) pivotally mounted at $m^{15}$ and provided with rollers $m^{16}$ engaging cams $m^{17}$ keyed on a shaft $m^{18}$. Movement is imparted to the shaft $m^{18}$ by arms $m^{19}$ connected with the slotted ends of rods $m^{20}$, the rods being connected with arms $m^{21}$ on a shaft $m^{22}$ actuated by an arm $m^{23}$, a rod $m^{24}$ and a lever $m^{25}$ provided with a roller $m^{26}$ engaging a cam on the shaft $1'$ of the loom.

Two vertically slidable members $n^1$ are mounted in guides $n^2$ and are provided with rack teeth $n^3$ engaging toothed sectors $n^4$ carried by a shaft $n^5$ which also carries an arm $n^6$ connected by a link $n^7$ with a lever $n^8$ provided with a roller $n^9$ engaging a cam on the shaft $1'$ of the loom. Inwardly facing U-shaped members $n^{10}$ (Figs. 20, 23, and 24) are secured to the lower ends of the members $n^2$. The U-shaped members $n^{10}$ provide vertically disposed channels the lower ends of which are adapted to close by angular arms $n^{11}$ pivotally mounted at $n^{12}$ and provided with an actuating finger $n^{13}$. In the position shown in Fig. 20 the angular members $n^{11}$ are so positioned as to close the lower ends of the channels presented by the U-shaped members $n^{10}$ whereas in Fig. 24 the angular members $n^{11}$ are tilted outwardly to open said channels. When the angular members are in the closed position shown in Fig. 20, they engage and hold the needle boxes 4 but when moved to the position shown in Fig. 24, such angular members are so displaced as to permit the needle box to fall through the U-shaped members $n^{10}$.

Figures 15, 22, 23:
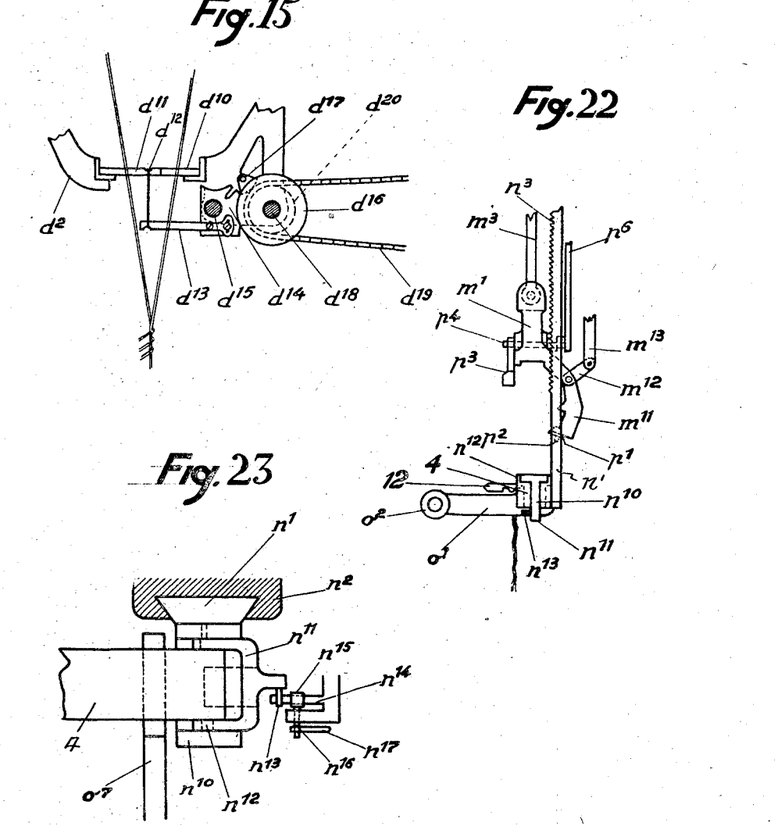
Fig. 15 is a view similar to Fig. 14 showing certain of the parts in a different position.
Fig. 22 is a view similar to Fig. 21 showing the parts in the position they assume at the moment a box containing a fresh supply of needles is picked up by the needle changing device.

As shown in Figs. 23 and 24, the angular members $n^{11}$ are swung outwardly to inoperative position by cams $n^{14}$ which are fixed to the frame of the loom and engage the pins $n^{13}$ as the vertically movable members $n^1$ reach the limit of their descending movement. An angle lever $n^{15}$ is pivotally mounted at $n^{16}$ adjacent each cam $n^{14}$ and one arm thereof is normally held in engagement with said cam by the tension of a spring $n^{17}$. During the downward movement of the pin $n^{23}$ the latter displaces the lever $n^{14}$ and, in its upward movement, the pin $n^{13}$ rides along the edge adjacent the arm of the lever $n^{15}$ and returns by gravity to operative position.

Two arms $o^1$ (Figs. 1 and 2) are pivotally mounted at $o^2$ and are adapted, during their swinging movement, to pick up the needle box which has been advanced by the pawl $k^{19}$, the ends of the arms $o^1$ being claw shaped and arranged to partially embrace the end pieces 13 of the needle boxes. Movement is imparted to the arms $o^1$ through an arm $o^3$, and rod $o^4$ connected therewith and with a lever $o^5$ the roller $o^6$ of which engages a cam on the shaft $1''$ of the loom. Two lower arms $o^7$ somewhat longer than the arms $o^1$ are pivotally mounted at $o^8$ and adapted to receive the box containing the row of used needles and to deposit it on the lower racks $k^2$. The arms $o^7$ are connected with arms $o^9$ and links $o^{10}$ connected with a lever $o^{11}$ provided with a roller $o^{12}$ engaging a cam on the shaft $3''$.

A needle locking bar $p^1$ (Figs. 20 and 22) similar in construction and operation to the needle locking bar $f^3$ described above in connection with the carriages is mounted on the vertically movable member $m^1$ and is provided with a pin $p^2$ adapted when the jaw $m^{11}$ closes, to enter a fork $p^3$ mounted on a shaft $p^4$ supported in the member $m^1$. The shaft $p^4$ is actuated by a lever $p^5$ (Fig. 2) a rod $p^6$, a crank $p^7$, a rod $p^8$ and a lever $p^9$ provided with a roller $p^{10}$ engaging a cam on the shaft $1'$.

Figures 27, 28, 29, 38, 39, 40:
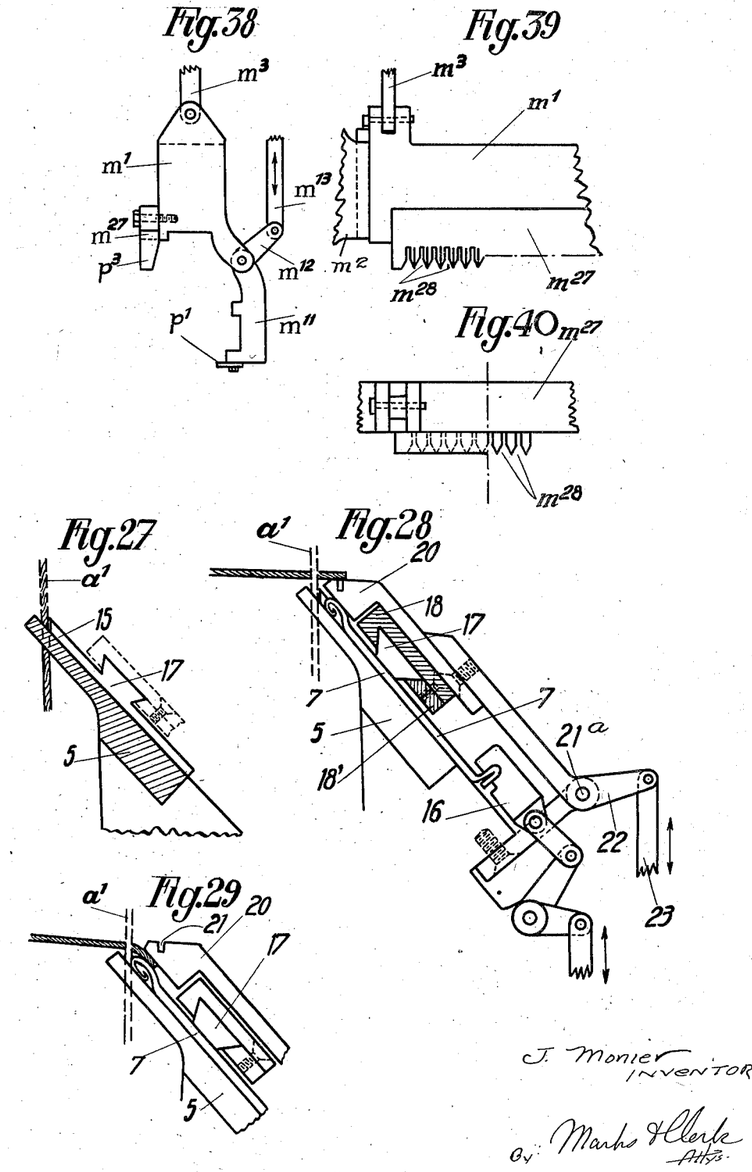
Fig. 27 is a partial sectional view of the clamping and cutting table showing one of the grooves for receiving a hook.
Fig. 28 is a detail view of the cutting and clamping table, showing the pile thread after passage of the needle over the table.
Fig. 29 is a similar detail view showing the end of the pile thread between the hooks and cutting clamping member.
Fig. 38 is a view similar to Fig. 22 on an enlarged scale and showing the device for positioning the pile thread needles.
Figs. 39 and 40 are front and top plan views, respectively, of Fig. 38.

In order to accurately position the needle boxes in position between the member $m^1$ and the jaw $m^{11}$, a comb-like member $m^{27}$ is secured to the member $m^1$ and is formed with slots $m^{28}$ having V-shaped edges as shown in Figs. 39 and 40 for properly guiding the needles in the recesses of the box.

In the foregoing the construction of the various mechanisms constituting the loom have been described as well as the operation of each individual mechanism and the following is a general description of the complete operation of the loom.

One of the projections $b^{12}$ on the chain $b^{11}$ lifts one of the levers $b^{13}$ thereby actuating the dog $b^{15}$ of the related Bliss clutch. The clutch then drives the shaft $b^3$ through one revolution, the cam $b^5$ causing the push piece $b^6$ to rise so that the latter advances the ratchet wheel $b^8$ to the extent of one tooth and consequently the three chains $b^{11}$ are moved a distance of one link. Another projection of the same chain comes into operation and the same shaft continues its rotation in the same manner until no further projections on the chains are encountered. At this moment a series of projections on another of the chains causes initiation of operation of another of the shafts and so on until the shafts 1, 2, and 3 of the loom have been operated in proper sequence and to the extent necessary for carrying out the various weaving operations.

These operations occur in the following order: The shaft 2 rotates and the batten $c^1$ is raised and actuated (Figs. 7 to 9), to effect the first selection of the warp threads while the table 5 is swung to elevated position so as to cover the knot stitches of the preceding row.

The shaft 2 comes to rest and the shaft 3 rotates, the cam on the latter causing operation of the mechanism (Fig. 18) controlling the movement of the carriages $f^1$. The two carriages stop, with the sheet of warp threads $a^1$ between them for the exchange of the needles 12 and thus the needles held in the left hand carriage $f^1$ pass through the warp threads $a^1$ in accordance with the selection of the latter and the ends of the needles enter the right hand carriage. Upon stoppage of the carriages, the movement of the nut $h^3$ in the right hand carriage is arrested and the screw $h^1$ which continues to turn, slides axially in its bearings, the axial displacement of the screw causing the right hand clutch $h^{12}$ to be disengaged. The right hand pawl $h^{16}$ is brought back and the left hand pawl is displaced thereby effecting the engagement of the left hand clutch. The screw $h^1$ turns in a counter direction and the nut $h^3$ returns to the right whereby retracting motion is imparted to the carriages, the right hand carriage carrying the row of needles and pulling the threads wound around the warp threads to form stitches. The stop $i^1$ then becomes operative, its right hand end being engaged with the bearing $h^2$ and its left hand end being disposed to stop the nut $h^3$ in its advance along the screw $h^1$ towards the right. By this stoppage of the nut, the screw $h^1$ is displaced axially in the direction opposite that first mentioned thereby disengaging the clutch $h^{11}$ and locking the left hand fork $h^6$ by the right hand pawl $h^{16}$. At this moment the motion of the shaft 3 ceases but it is again set in motion to advance the carriages toward the warp, exchange the needles 12 to the left hand carriage and pull the threads and finish the stitches of the row.

Figure 12:
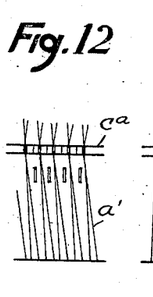

When the shaft 3 stops and the shaft 2 resumes rotation, the batten is returned and descends to beat up the weft threads and it is again lifted and moved laterally for the second selection (Fig. 12).

The member 20 moves away from and towards the hooks, thus covering the ends of the pile threads (Fig. 31).

The shaft 2 again stops and the shaft 3 resumes operation. The carriages exchange needles and, in retracting, the stop $i^1$ moves upwardly, the pile threads are stretched at the end of travel of the carriages, thereby disengaging the carriage driving mechanism and arresting the movement of the carriages. The tension of the spring $h^8$ may be regulated so as to vary the tension of the loops at the end of travel of the carriage, as desired.

Figure 13:
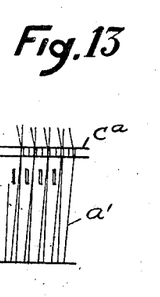

The shaft 3 stops and the shaft 2 resumes rotation and the batten moves laterally (Fig. 13) for the third selection. The shaft 2 again stops and the shaft 3 resumes rotation and for the third time the needles pass through the warp threads, and the shaft 3 comes to rest.

Figure 11:
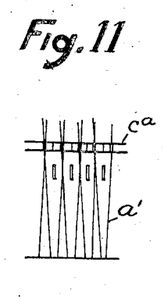
Figs. 11 to 13 are diagrammatic views showing the selection of the warp threads.

The shaft 2 resumes rotation, the batten swings and returns to the first selection (Fig. 11) and at the same time the hook 7 and the back comb 6 operate for the transformation into Smyrna stitch; the multiple cutting blades (Figs. 36 and 37) rise and sever the stitched pile threads and then descend. The shaft 2 stops and the shaft 3 makes its final revolution whereby the needles are transferred from the right hand carriage $f^1$ to the left hand carriage, the left hand carriage being now adapted to have the row of used needles therein withdrawn by the needle changing device.

The shaft 2 again starts and completes its cycle which returns it to the position shown in Fig. 2 and then stops.

Figure 16:
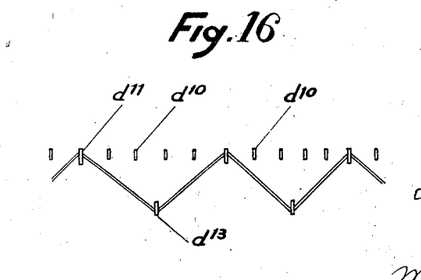
Fig. 16 is a diagrammatic view showing the operation of the weft extending fingers.
Figure 17:
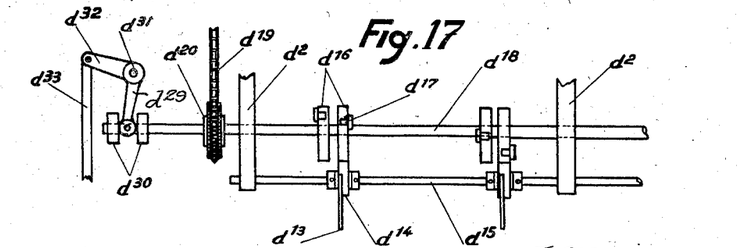
Fig. 17 is a diagrammatic top plan view of the operating means for the weft extending fingers.

At this time the shaft 1 resumes operation, the batten rises to the position shown in Figs. 14 and 15; the shuttle race is formed by the arms $d^2$, the shed forming device 8 operates to form the shed, and the shuttle is thrown. The shaft $d^{18}$ is set in motion (Figs. 14, 15, and 17), the Maltese crosses turn one after the other, swinging the fingers $d^{13}$ downwardly thereby extending the weft as shown in Fig. 16. The fingers are subsequently restored to normal position and the shed is closed.

The race forming members $d^2$ separate, the batten starts to descend but is retained by the toggle links $e^1$ and $e^2$ the latter engaging the pin $e^4$. At the moment when the cam on the shaft 1 engages and operates the roller $e^{10}$, the lever $e^6$ breaks the toggle joint formed by the links $e^1$ and $e^2$ and the batten falls freely thereby beating the weft. The batten is again raised, the shuttle race is again formed, the shed opens in the opposite direction, the shuttle is thrown for the second weft which is distributed and extended by the fingers $d^{13}$ but in the reverse order by the disks $d^{16}$.

The lever $h^{23}$ acting on the finger $h^{25}$ of one of the rods $h^{18}$ operates the related dog $h^{16}$ thereby actuating the carriage drive mechanism (Fig. 18), to cause the carriages to be restored to their outermost positions.

As soon as the carriages assume their outermost positions, the vertically movable member $m^1$ of the needle changing device (Figs. 2, 20, 21, and 38) descends to the level of the left hand Said left hand carriage advances and the needles Said left hand carriage advances and the needles therein are inserted in the empty box 4 held clamped against the member $m^1$ by the clamping jaw $m^{11}$. The needle locking bar $p^1$ is operated and upon the following retracting movement of the carriage $f^1$ the row of needles is held in the box 4 clamped against the vertically movable member $m^1$ by the jaw member $m^{11}$. The jaw member $m^{11}$ is then opened and the box 4 containing the used needles is moved downwardly in the U-shaped members $n^{10}$ carried by the vertically slidable members $n^1$. At the limit of the downward movement of the members $n^1$ the cams $n^{14}$ tilt the angular arms $n^{11}$ outwardly thereby releasing the box 4 and permitting the latter to fall into the arms $o^7$ which latter subsequently swing downwardly and deposit said box on the lower rack $k^2$. During the upward movement of the U-shaped members $n^{10}$, the angular members $n^{11}$ carried thereby engage the ends of a box containing a fresh supply of needles which has been lifted from the upper rack $k^1$ by the arms $o^1$ into the path of movement of the members $n^{10}$ and $n^{11}$. The fresh needle box is moved upwardly against the member $m^1$ and is clamped thereon by the jaw $m^{11}$ and during the subsequent advance of the carriage, the fresh supply of needles is inserted and locked therein.

At this moment the vertically movable members $m^1$ and $n^1$ are moved upwardly out of the path of the left hand carriage $f^1$ and the above cycle of operations is automatically repeated, the box containing needles with fresh supplies of pile thread being periodically advanced by the pawls $k^{19}$ and the box containing used needles deposited on the lower rack $k^2$ being moved along by the lever $k^{21}$, the transfer of boxes from one rack to the other being effected by the vertically movable claw member $k^5$.

Figure 25:
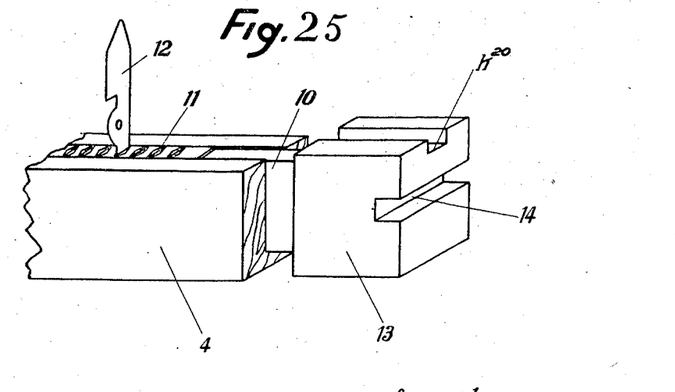
Fig. 25 is a fragmentary perspective view of one of the needle boxes.
Figure 26:
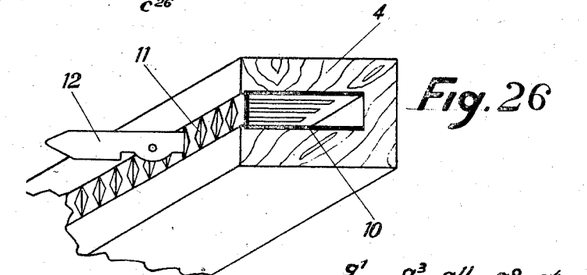
Fig. 26 is a perspective detail of the needle box shown in section.

As shown in Figs. 25 and 26, the needle boxes 4 may be formed of a grooved strip of wood in which is inserted a stamped metal cage 10 having slots 11 therein for the reception of the pile thread needles 12.

I claim:

1. In a loom for automatically weaving knot stitch carpets, warp selecting and weft beating means, movable carriages, a row of needles adapted to pass pile threads through the warp threads, said needles being adapted to be alternately exchanged from one carriage to the other during movement of the latter to wind pile threads around the warp threads, means for actuating said carriages periodically, shuttle track forming members movable into position in the warp threads, a weft containing shuttle movable on said members, means for moving said members to operative position following the period of actuation of said carriages by said actuating means for the transmission of a foundation weft by said shuttle, a needle changing device for removing said row of needles from one of said carriages and inserting a new row therein, and means for actuating said needle changing device during the formation of the foundation fabric.

2. A loom as claimed in claim 1, characterized in that said warp selecting and weft beating means includes a vertically movable batten, and releasable means for lifting said batten to normal position, said releasable means permitting the free fall of the batten for beating up the weft threads.

3. A loom as claimed in claim 1 characterized in that said warp selecting and weft beating means includes a vertically movable batten and guides movably receiving said batten, means mounting said guides for lateral oscillating movement and displacement in the direction of the axis of the batten for producing the selection of the warp threads, and means for imparting movement to said guides to oscillate said batten and displace the latter axially.

4. A loom as claimed in claim 1 characterized by the provision of means for periodically locking the needles in said carriages following the exchange of the needles from one carriage to the other.

5. A loom as claimed in claim 1 characterized by the provision of positioning members movable with the carriages and engaging said needles to maintain the latter in uniformly spaced relation and insuring the exchange of the row of needles from one carriage to the other.

6. A loom as claimed in claim 1 characterized by the provision of members carried by the carriages and coacting with the needles for positioning the latter, and means yieldably supporting said positioning members and adapted upon mutual engagement of the positioning members carried by the advancing carriages to permit said positioning members to be displaced.

7. A loom as claimed in claim 1 characterized by the provision of members carried by the carriages and coacting with the needles for positioning the latter, means yieldably supporting said positioning members and adapted upon mutual engagement of the positioning members carried by the advancing carriages to permit said positioning members to be displaced, and releasable means to lock the positioning members in displaced positions.

8. A loom as claimed in claim 1 characterized by the provision of means for extending the weft thread laid by the shuttle.

9. A loom as claimed in claim 1 characterized by the provision of means for extending the weft thread laid by the shuttle, the last mentioned means including fingers pivotally mounted on the shuttle track forming members, and means for periodically actuating said fingers.

10. A loom as claimed in claim 1 characterized by the provision of releasable means for locking the row of needles in each carriage, said needle changing device including auxiliary gripping means adapted to engage the needles presented thereto during operation of the changing device to lock the needles in position in the latter during changing.

11. A loom as claimed in claim 1 characterized in that said needle changing device includes a two-part element movable into the path of the adjacent carriage, and means for moving one of said parts into position to embrace said needles and effect removal thereof during the subsequent retraction of the carriage.

12. A loom as claimed in claim 1 characterized in that said needle changing device includes a two-part element movable into the path of the adjacent carriage, and means for moving one of said parts into position to embrace said needles and effect removal thereof during the subsequent retraction of the carriage, and a needle locking member carried by the changing device for locking the needles in position therein.

13. A loom as claimed in claim 1 characterized by the provision of a positioning member carried by the changing device and coacting with the needles in one of the carriages during the changing operation.

14. A loom as claimed in claim 1 characterized by the provision of racks for supporting bars containing used and unused needles, said needle changing device being provided with a needle bar adapted to receive used needles from the adjacent carriage during the changing operation, arms arranged to receive the needle bar from the changing device and adapted to deposit said bar on the rack for used needle bars, and means for picking an unused bar of needles from the rack and positioning said bar in the path of the changing device to be engaged by the latter.

JULES MONIER.